J. W. & G. F. BURGESS.
TIRE.
APPLICATION FILED SEPT. 2, 1913.
1,115,389.
Patented Oct. 27, 1914.
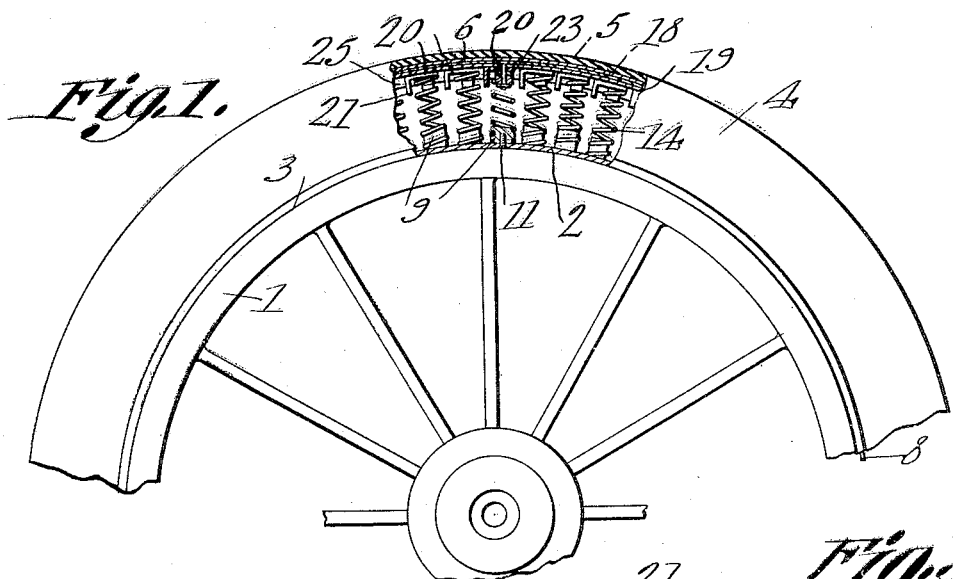
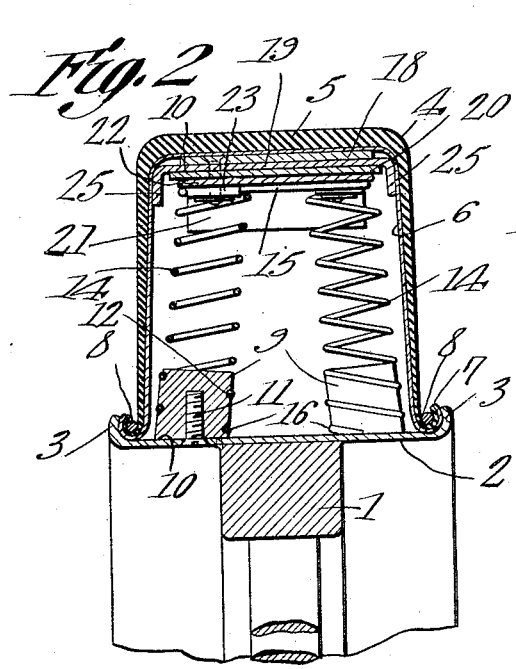
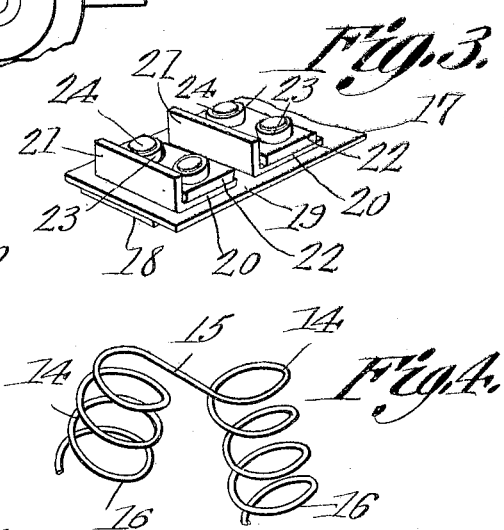
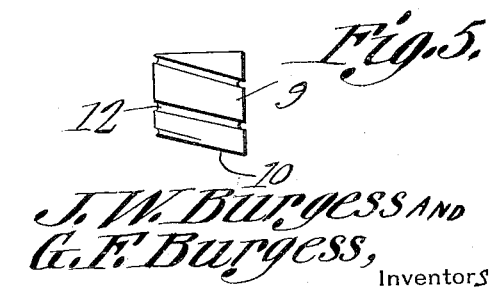
J. W. Burgess and
G. F. Burgess,
Inventors

UNITED STATES PATENT OFFICE.

JOHN W. BURGESS AND GEORGE F. BURGESS, OF BROOKFIELD, MISSOURI.

TIRE.

1,115,389.　　　　　　　Specification of Letters Patent.　　　Patented Oct. 27, 1914.

Application filed September 2, 1913. Serial No. 787,772.

*To all whom it may concern:*

Be it known that we, JOHN W. BURGESS and GEORGE F. BURGESS, citizens of the United States, residing at Brookfield, in the county of Linn, State of Missouri, have invented a new and useful Tire, of which the following is a specification.

The device forming the subject matter of this application is a resilient tire of that general type in which pneumatic features are replaced by springs.

One object of the present invention is to provide novel means for assembling the springs with the rim.

Another object of the invention is to provide a device of the type above described, including converging helical springs acting as braces for each other.

Another object of the invention is to provide novel means for assembling the outer ends of the springs with the tread.

The invention aims, also, to provide novel means whereby the outer ends of the springs are prevented from coming into contact with each other.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing:—Figure 1 shows in side elevation, a tire constructed in accordance with the present invention, parts being broken away; Fig. 2 is a transverse section of the structure shown in Fig. 1; Fig. 3 is a fragmental perspective showing a portion of the tread; Fig. 4 is a perspective view showing a pair of connected springs which enter into the construction of the device; and Fig. 5 is a side elevation of one of the spring engaging, rim-carried studs.

In the accompanying drawings, the numeral 1 indicates the felly of a wheel, surrounded circumferentially by a metallic rim 2 equipped along its longitudinal edges with flanges 3.

A casing 4 is shown, and this casing may be of any desired form. In the present instance, the casing 4 is depicted as comprising an outer facing 5 which may be made of rubber or the like, there being a lining 6 disposed within the facing 5, the lining 6 being made of canvas, leather, or any other flexible material, adapted to the end in view. The longitudinal edges 7 of the casing 4 lie against the flanges 3 of the rim 2 and are held in place by means of retaining rings 8 or any other device suitable for the purpose.

Secured to and projecting outwardly from the rim 2 are a plurality of studs 9 which may be fashioned from metal, the studs being disposed in pairs. The studs converge as they extend outwardly, and the inner ends of the studs are truncated so that the bases 10 of the studs which rest against the rim 2 define an acute angle with the axes of the studs. Securing elements 11 pass outwardly through the rim 2 and enter the studs 9. The axes of the threaded securing elements 11 define an acute angle with the inclined, converging axes of the studs 9. Owing to the feature last above pointed out, it will be obvious that after the threaded securing elements are mounted in place in engagement with the studs 9, relative movement between the studs and the securing elements will be impossible, the studs being retained firmly in place upon the rim 2. The studs 9 are provided with superficial, circumscribing, spiral grooves 12, as shown to best advantage in Fig. 5.

A plurality of spring structures are provided, and one of these spring structures is shown in perspective in Fig. 4. Each spring structure is a one piece element, and comprises helical springs 14 and a connection 15 between the outer ends of the springs. The free inner convolutions 16 of the springs 14 are engaged in the spiral grooves 12 of the studs 9.

The invention further includes a retaining member or tread, denoted generally by the numeral 17, the retaining member 17 comprising an outer strip 18 and an inner strip 19, the strips 18 and 19 preferably being fashioned from tanned leather. A plurality of separate sections 20 are mounted upon the inner face of the strip 19, the free ends of the sections 20 being bent to form inwardly extended tongues 21. The sections 20 may be made of tanned leather, or any other suitable substance. Applied to the strip engaged portions of the sections 20 are transversely extended abutments 22 which may be made of raw-hide. The outer ends of the springs 14 are received by the abutments 22 and lugs 23 are applied to the abutments, the lugs 23 being received within the outer ends of the springs. The lugs 23, like the abutments 22 may be made of raw-hide, although any other suitable substance may be resorted to if desired. Rivets 24 or other retaining elements adapted to a like end connect the strips 18 and 19, the sections 20, the abutments 22 and the lugs 23, as will be best understood from Fig. 3. The inner strip 19 is wider than the outer strip 18 and the edges of the inner strip may be folded inwardly to form flanges 25, the flanges 25 being folded across the ends of the sections 20 which are reinforced by the relatively stiff abutments 22. The flanges 21 of the sections 20 extend between the outer ends of the pairs of springs. It is to be observed that the flanges 21 and the flanges 25 coöperate to form substantially rectangular compartments in which the outer ends of the springs 14 are inclosed.

Especial attention is directed to the converging relation of the springs 14, and the fact that the springs 14 are united at their outer ends by the integrally formed portion 15. The springs 14 are thus held in converging relation, and each spring acts as a brace for the other.

Having thus described the invention, what is claimed is:—

In a device of the class described, a rim; a tread; studs carried by the tread; and a pair of helical springs secured at their inner ends to the rim, the springs being disposed in alinement transversely of the rim, the springs being wound in the same direction and the outer convolutions of the springs being united by an integral connection extended diagonally of a plane passing through the centers of the springs, the connection bearing against opposite faces of the respective studs circumferentially of the tread.

In testimony that we claim the foregoing as our own, we have hereto affixed our signatures in the presence of two witnesses.

JOHN W. BURGESS.
GEORGE F. BURGESS.

Witnesses:
THOMAS E. BURNS,
C. B. BURNS.

---

Copies of this patent may be obtained for five cents each, by addressing the "Commissioner of Patents, Washington, D. C."